(12) United States Patent
Yamaji et al.

(10) Patent No.: US 12,342,427 B2
(45) Date of Patent: Jun. 24, 2025

(54) SHEET-LIKE HEATER

(71) Applicant: TOMOEGAWA CO., LTD., Tokyo (JP)

(72) Inventors: Maika Yamaji, Shizuoka (JP); Yosuke Sugawara, Shizuoka (JP); Taku Kurahara, Shizuoka (JP)

(73) Assignee: TOMOEGAWA CORPORATION (JP)

( * ) Notice: Subject to any disclaimer, the term of this patent is extended or adjusted under 35 U.S.C. 154(b) by 831 days.

(21) Appl. No.: 17/428,682

(22) PCT Filed: Feb. 10, 2020

(86) PCT No.: PCT/JP2020/005188
§ 371 (c)(1),
(2) Date: Aug. 5, 2021

(87) PCT Pub. No.: WO2020/170888
PCT Pub. Date: Aug. 27, 2020

(65) Prior Publication Data
US 2022/0124877 A1    Apr. 21, 2022

(30) Foreign Application Priority Data
Feb. 20, 2019  (JP) .................................. 2019-028075

(51) Int. Cl.
*H05B 3/36*      (2006.01)
*B32B 7/027*    (2019.01)
(Continued)

(52) U.S. Cl.
CPC .............. *H05B 3/36* (2013.01); *B32B 7/027* (2019.01); *B32B 7/12* (2013.01); *B32B 27/08* (2013.01);
(Continued)

(58) Field of Classification Search
CPC ........ B32B 2262/103; B32B 2307/302; B32B 2307/304; B32B 2457/00; B32B 27/08;
(Continued)

(56) References Cited

U.S. PATENT DOCUMENTS 3,774,299 A * 11/1973 Sato ...................... B32B 27/34
219/544
4,250,398 A *  2/1981 Ellis ...................... H05B 3/36
428/323

(Continued)

FOREIGN PATENT DOCUMENTS

CA    2464923 A1    10/2004
CN    1543264 A    11/2004
(Continued)

OTHER PUBLICATIONS

International Search Report (English and Japanese) of the International Searching Authority issued in PCT/JP2020/005188, mailed Apr. 14, 2020; ISA/JP (6 pages).
(Continued)

*Primary Examiner* — Sang Y Paik
(74) *Attorney, Agent, or Firm* — Harness, Dickey & Pierce, P.L.C.

(57) ABSTRACT

A sheet-like heater is provided that can be heated quickly and demonstrates excellent heat uniformity, with the wires of the sheet-like heater being insusceptible to breaking. The sheet-like heater has a layered structure and includes: a sheet-like base; a first resin layer that is attached to a principal face of the sheet-like base and comprises a first resin agent; a mixed layer A that is connected to the first resin layer and comprises a mixture of the first resin agent and metallic fibers; a metallic fiber layer that is connected to the mixed layer A, consists only of metallic fibers, and contains air therein; a mixed layer B that is connected to the metallic fiber layer and comprises a mixture of metallic (Continued)

fibers and a second resin agent; and a second resin layer that is connected to the mixed layer B and comprises the second resin agent.

9 Claims, 5 Drawing Sheets

(51) Int. Cl.
*B32B 7/12* (2006.01)
*B32B 27/08* (2006.01)
*B32B 27/20* (2006.01)

(52) U.S. Cl.
CPC ........ *B32B 27/20* (2013.01); *B32B 2262/103* (2013.01); *B32B 2307/302* (2013.01); *B32B 2307/304* (2013.01); *B32B 2457/00* (2013.01)

(58) Field of Classification Search
CPC .......... B32B 27/20; B32B 7/027; B32B 7/12; H05B 2203/026; H05B 2203/029; H05B 3/36
USPC .................................. 219/546–548, 527–529
See application file for complete search history.

(56) References Cited

U.S. PATENT DOCUMENTS

| | | | | |
|---|---|---|---|---|
| 4,434,023 A | * | 2/1984 | Kanamori | ................ H05B 3/36 156/332 |
| 4,560,428 A | * | 12/1985 | Sherrick | ............. B29C 65/4835 156/286 |
| 2003/0007542 A1 | * | 1/2003 | Peterman, Jr. | ......... G01G 21/14 374/14 |
| 2004/0069772 A1 | * | 4/2004 | Kondo | ................... H05B 3/145 219/549 |
| 2018/0134926 A1 | | 5/2018 | Lei et al. | |
| 2018/0364625 A1 | * | 12/2018 | Yagi | .................. G03G 15/2053 |

FOREIGN PATENT DOCUMENTS

| | | |
|---|---|---|
| CN | 104918340 A | 9/2015 |
| CN | 206602672 U | 10/2017 |
| JP | H11-317284 A | 11/1999 |
| JP | 2005-093076 A | 4/2005 |
| JP | 2005-120675 A | 5/2005 |
| JP | 3122226 U | 6/2006 |
| JP | 2014-111335 A | 6/2014 |
| JP | 2015-122180 A | 7/2015 |
| JP | 2016-44908 A | 4/2016 |
| KR | 2011-0110573 A | 10/2011 |
| TW | 2010-24489 A | 7/2010 |
| WO | 9960823 A1 | 11/1999 |
| WO | 2014-064999 A1 | 5/2014 |
| WO | 2016-113633 A1 | 7/2016 |

OTHER PUBLICATIONS

Office Action issued in the corresponding Korean Patent Application No. 10-2021-7025410; mailed Apr. 7, 2023 (total 8 pages).
Office Action issued in the corresponding Chinese Patent Application No. 202080014894.3; dated Oct. 25, 2023 (total 18 pages).
European Search Report issued in European Patent Application No. 20760273.1; dated Oct. 21, 2022 (total 7 pages).

* cited by examiner

SHEET-LIKE HEATER

CROSS REFERENCE TO RELATED APPLICATIONS

This application is a U.S. National Phase Application under 35 U.S.C. 371 of International Application No. PCT/JP2020/005188, filed on Feb. 10, 2020, which claims priority to Japanese Patent Application No. 2019-028075, filed on Feb. 20, 2019. The entire disclosures of the above applications are expressly incorporated by reference herein.

BACKGROUND

Technical Field

The present invention relates to a sheet-like heater.

Related Art

Several sheet-like heaters have heretofore been proposed.

For instance, JP 2005-93076 A describes a sheet-like heat generator formed by using an electrically conductive sheet-like non-woven fabric including a base constituting the non-woven fabric and electrically conductive fibers, the sheet-like heat generator being characterized in that the electrically conductive non-woven fabric has electrodes and are laminated with a flexible thermoplastic resin film. That is, a sheet-like heat generator formed by an electrically conductive non-woven fabric which includes a Japanese paper base and carbon fibers is proposed as a heat generator having excellent flexibility. And, JP 2005-93076 A describes that such a sheet-like heat generator can be obtained by a simple method and enables easy processing techniques matched with utilization forms and easy working techniques, and therefore the sheet-like heat generator can be widely used in applications such as melting of snow and freeze proofing in various buildings, various structures, roads/railroads, and vehicles, and can be also used in applications such as heat retaining heaters for raising of seedling in horticultural facilities and the like, and cockroach traps.

For instance, JP 2015-122180 A describes a flexible heater including a highly heat-conductive flexible sheet made of metallic fibers or other fibers having heat resistance and good thermal conductivity, and a heater cord disposed in proximity to or in contact with one surface of the highly heat-conductive sheet, the flexible heater being used with an opposite surface of the highly heat-conductive sheet facing an object to be heated. That is, a flexible heater including a highly heat-conductive sheet and a heater cord is proposed. And JP 2015-122180 A describes that according to the heater as described above, it is possible to provide a flexible heater which is light in weight and less costly and has good handleability, with which an object to be heated can be consistently and efficiently heated to a predetermined temperature or above within a very wide temperature range, which can be prevented from being melted or disconnected due to an excessive increase of the temperature of the heater cord, and which can be suitably used to heat, for example, molds for molding, extruders, resin passages, and the like.

However, the sheet-like heat generator described in JP 2005-93076 A used, for instance, a heat generator formed by using a mixture of Japanese paper and carbon fibers and was poor in fast heating properties and heat uniformly due to the intervening non-conductive/less conductive substance.

Further, the flexible heater described in JP 2015-122180 A was low in heat uniformity and had a high risk of disconnection.

An object of the present invention is to solve the problems as described above. More specifically, an object of the present invention is to provide a sheet-like heater which is excellent in fast heating properties and heat uniformly and is less likely to cause disconnection.

SUMMARY

The inventors of the present invention have made an intensive study to solve the problems described above and completed the present invention.

The present invention provides the following (1) to (9).

(1) A sheet-like heater having a layered structure, the sheet-like heater including:
 a sheet-like base;
 a first resin layer attached to a main surface of the sheet-like base and consisting of a first resin agent;
 a mixed layer A connected to the first resin layer and consisting of a mixture of the first resin agent and metallic fibers;
 a metallic fiber layer connected to the mixed layer A, including only the metallic fibers, and containing air in its interior;
 a mixed layer B connected to the metallic fiber layer and consisting of a mixture of the metallic fibers and a second resin agent; and
 a second resin layer connected to the mixed layer B and consisting of the second resin agent.

(2) The sheet-like heater according to (1) above, further including: an insulating layer having one main surface attached to the second resin layer.

(3) The sheet-like heater according to (2) above, further including:
 a third adhesion layer attached to an opposite main surface of the insulating layer and consisting of a third adhesive;
 a heat diffusion layer having one main surface attached to the third adhesion layer; and
 a fourth adhesion layer attached to an opposite main surface of the heat diffusion layer and consisting of a fourth adhesive.

(4) The sheet-like heater according to any one of (1) to (3) above,
 wherein the sheet-like base has insulation properties and/or thermal insulation properties.

(5) The sheet-like heater according to (3) or (4) above, wherein thermal conductivity of the heat diffusion layer in its planar direction is higher than thermal conductivity of the metallic fiber layer in its planar direction.

(6) The sheet-like heater according to any one of (3) to (5) above,
 wherein the metallic fiber layer consists of an SUS fiber sheet, and
 wherein the heat diffusion layer consists of a carbon film.

(7) The sheet-like heater according to any one of (1) to (6) above, wherein the metallic fiber layer is configured so that, when current is applied to the metallic fiber layer, the current flows within a band-like electrical flow path having a width of 100 mm or less from an electrical input side to an electrical output side.

(8) The sheet-like heater according to (7) above, wherein at least a part of the electrical flow path has slits formed along directions in which the current flows.

(9) The sheet-like heater according to (8) above, wherein the slits are formed at least at bent portions of the electrical flow path.

Effect of the Invention

The present invention can provide a sheet-like heater which is excellent in fast heating properties and heat uniformity and is less likely to cause disconnection.

DETAILED DESCRIPTION

The sheet-like heater of the invention generates heat through application of current and can be therefore used, for instance, as a heater for heating the interior of an electric vehicle. In the electric vehicle that cannot use exhaust heat from an engine, power consumption used for heating is large. However, the sheet-like heater of the invention can be preferably used as a heater for heating the interior of the electric vehicle because of its high power consumption efficiency.

Further, although the heater for heating the interior of an electric vehicle is required to have fast heating properties and heat uniformity, the sheet-like heater of the invention has fast heating properties and heat uniformity. In the case of the heater for heating the interior of an electric vehicle, for instance, the surface temperature of the heater is preferably quickly increased to about 40° C. Further, the heater preferably has such heat uniformity that temperature differences at the whole surface of the sheet fall within several degrees Celsius.

When the sheet-like heater of the invention is attached to a curved surface, layers constituting the sheet-like heater of the invention, particularly a sheet-like base and a metallic fiber layer are required to be made of flexible materials. When the sheet-like heater of the invention also has an insulating layer and a heat diffusion layer, these layers are also required to be made of flexible materials. For instance, when the sheet-like heater of the invention is attached to the wall of the interior of an electric vehicle and used, if the wall of the interior of the vehicle has a curved surface, the sheet-like heater of the invention is required to have sufficient flexibility to follow the curved surface.

The sheet-like heater of the invention can be preferably used as a heater for heating piping. Conventionally, the heater for heating piping used a wire rod for heat generating elements and was therefore at risk for disconnection due to repeated attachment/detachment and disconnection due to heating under application of current, and accordingly it was necessary to increase the thickness of the wire rod to a certain degree. As a result, the heater for heating piping should have a larger thickness, thus leading to lower heating efficiency and lower adhesion to an object to be heated.

Because there are a countless number of current flowing pathways and the metallic fibers are connected to each other at a large number of points, the sheet-like heater of the invention is less likely to cause disconnection under repeated attachment/detachment of the heater, for instance. Further, the sheet-like heater has high adhesion to an object to be heated and excellent heating efficiency because of its small thickness.

Figure 1:
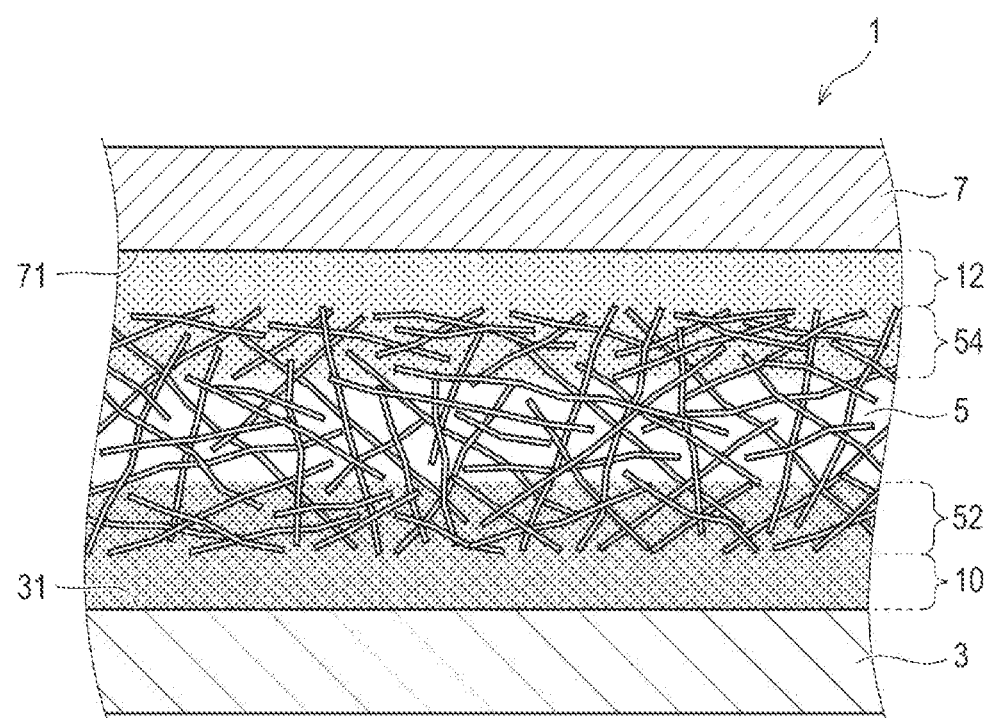
FIG. 1 is a cross-sectional view (schematic view) of a preferred embodiment of a sheet-like heater of the invention in a direction perpendicular to its main surface.

A preferred embodiment of the sheet-like heater of the invention is described using FIG. 1.

The sheet-like heater of the invention is a sheet-like heater having a layered structure, the sheet-like heater including: a sheet-like base; a first resin layer attached to a main surface of the sheet-like base and consisting of a first resin agent; a mixed layer A connected to the first resin layer and consisting of a mixture of the first resin agent and metallic fibers; a metallic fiber layer connected to the mixed layer A, including only the metallic fibers, and containing air in its interior; a mixed layer B connected to the metallic fiber layer and consisting of a mixture of the metallic fibers and a second resin agent; and a second resin layer connected to the mixed layer B and consisting of the second resin agent. The sheet-like heater is preferably a sheet-like heater further including: an insulating layer having one main surface attached to the second resin layer.

FIG. 1 is a cross-sectional view (schematic view) of such a preferred embodiment of the sheet-like heater in a direction perpendicular to its main surface.

The sheet-like heater (1) of the invention in the preferred embodiment in FIG. 1 is a sheet-like heater having a layered structure, the sheet-like heater including: a sheet-like base (3); a first resin layer (10) attached to a main surface (31) of the sheet-like base (3) and consisting of a first resin agent; a mixed layer A (52) connected to the first resin layer (10) and consisting of a mixture of the first resin agent and metallic fibers; a metallic fiber layer (5) connected to the mixed layer A (52), including only the metallic fibers, and containing air in its interior; a mixed layer B (54) connected to the metallic fiber layer (5) and consisting of a mixture of the metallic fibers and a second resin agent; a second resin layer (12) connected to the mixed layer B (54) and consisting of the second resin agent; and an insulating layer (7) having one main surface (71) attached to the second resin layer (12).

The sheet-like heater of the invention as described above can be preferably used as a heater for heating piping.

Figure 2:
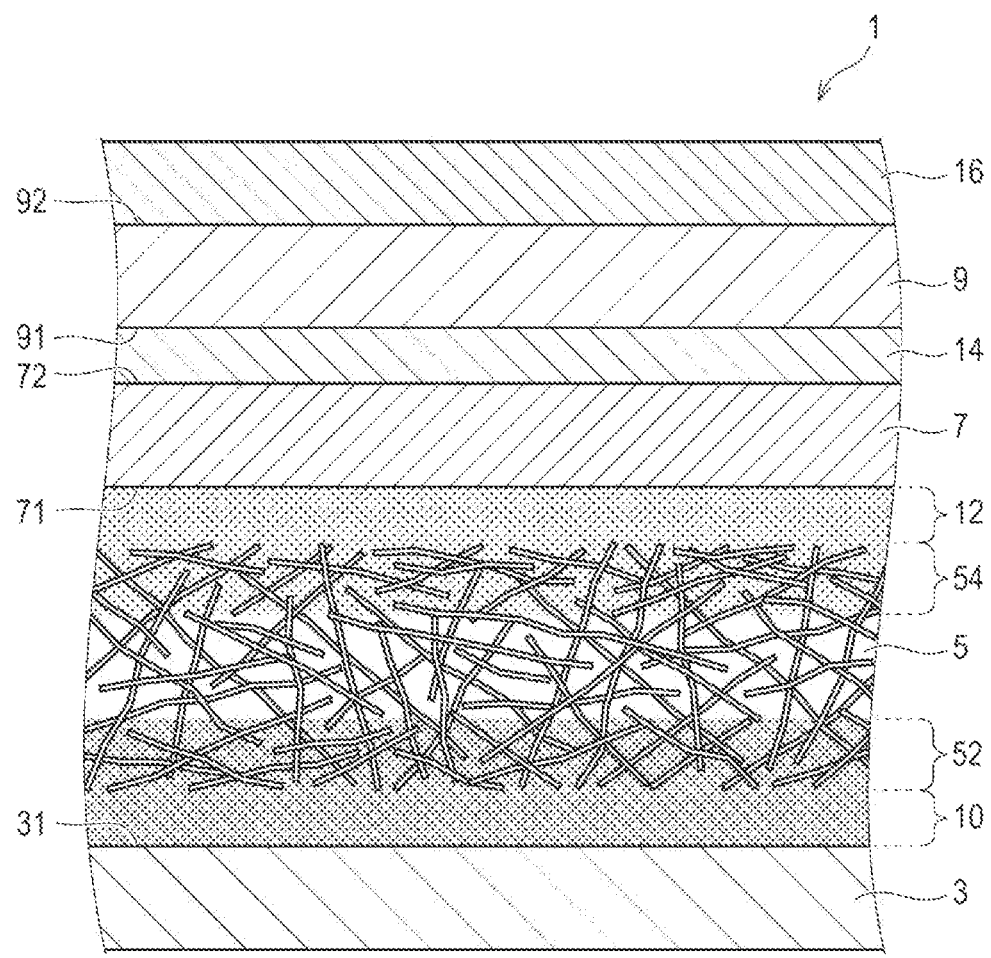
FIG. 2 is a cross-sectional view (schematic view) of another preferred embodiment of the sheet-like heater of the invention in a direction perpendicular to its main surface.

Another preferred embodiment of the sheet-like heater of the invention is described using FIG. 2.

The sheet-like heater of the invention is a sheet-like heater having a layered structure, the sheet-like heater including: a sheet-like base; a first resin layer attached to a main surface of the sheet-like base and consisting of a first resin agent; a mixed layer A connected to the first resin layer and consisting of a mixture of the first resin agent and metallic fibers; a metallic fiber layer connected to the mixed layer A, including only the metallic fibers, and containing air in its interior; a mixed layer B connected to the metallic fiber layer and consisting of a mixture of the metallic fibers and a second resin agent; and a second resin layer connected to the mixed layer B and consisting of the second resin agent. The sheet-like heater is preferably a sheet-like heater further including: an insulating layer having one main surface attached to the second resin layer; a third adhesion layer attached to an opposite main surface of the insulating layer and consisting of a third adhesive; a heat diffusion layer having one main surface attached to the third adhesion layer; and a fourth adhesion layer attached to an opposite main surface of the heat diffusion layer and consisting of a fourth adhesive.

FIG. 2 is a cross-sectional view (schematic view) of such a preferred embodiment of the sheet-like heater in a direction perpendicular to its main surface.

The sheet-like heater (1) of the invention in the preferred embodiment in FIG. 2 is a sheet-like heater having a layered structure, the sheet-like heater including: a sheet-like base (3); a first resin layer (10) attached to a main surface (31) of the sheet-like base (3) and consisting of a first resin agent; a mixed layer A (52) connected to the first resin layer (10) and consisting of a mixture of the first resin agent and metallic fibers; a metallic fiber layer (5) connected to the mixed layer A (52), including only the metallic fibers, and containing air in its interior; a mixed layer B (54) connected to the metallic fiber layer (5) and consisting of a mixture of the metallic fibers and a second resin agent; a second resin layer (12) connected to the mixed layer B (54) and including the second resin agent; an insulating layer (7) having one main surface (71) attached to the second resin layer (12); a third adhesion layer (14) attached to an opposite main surface (72) of the insulating layer (7) and consisting of a third adhesive; a heat diffusion layer (9) having one main surface (91) attached to the third adhesion layer (14); and a fourth adhesion layer (16) attached to an opposite main surface (92) of the heat diffusion layer (9) and consisting of a fourth adhesive.

The sheet-like heater of the invention as described above can be preferably used as a heater for heating the interior of an electric vehicle.

<Sheet-Like Base>

The sheet-like base (3) is now described.

When used as a heater for heating the interior of an electric vehicle, the sheet-like heater of the invention is placed so that the sheet-like base does not face a space to be heated.

In the sheet-like heater (1) of the invention, the sheet-like base (3) has a role in protecting the sheet-like heater (1) of the invention. Therefore, the sheet-like base is preferably made of a material having high strength.

The sheet-like base (3) preferably has insulation properties and/or thermal insulation properties. A specific example is a case where the sheet-like base (3) is made of a material having both the insulation properties and thermal insulation properties. Another example is a case where the sheet-like base has two layers including an insulating layer and a heat-insulating layer. This case enables efficient heat supply toward a direction in which heating is needed, and also contributes to heat uniformity (improvement in heat uniformity).

The sheet-like base (3) is preferably made of a material having insulation properties and flexibility, as exemplified by PET (polyethylene terephthalate), PI (polyimide), PP (polypropylene), PE (polyethylene), PEN (polyethylene naphthalate), and TAC (triacetyl cellulose).

The thickness of the sheet-like base is not particularly limited, and is preferably 15 to 100 μm, more preferably 30 to 75 μm, and still more preferably about 50 μm.

The thickness of the sheet-like base is determined as described below.

An enlarged image (200×) of a cross-sectional surface in a direction perpendicular to the main surface of the sheet-like heater of the invention (a cross-sectional surface as in FIG. 1 or FIG. 2) is obtained, and thereafter in the enlarged image of the cross-sectional surface, the thickness of the sheet-like base (3) is measured at randomly selected 100 points and a simple average value is determined. Then, the resulting average value is regarded as the thickness of the sheet-like base.

<First Resin Layer, Mixed Layer A, Metallic Fiber Layer, Mixed Layer B, and Second Resin Layer>

The first resin layer (10), the mixed layer A (52), the metallic fiber layer (5), the mixed layer B (54), and the second resin layer (12) are now described.

Metallic fibers constituting the metallic fiber layer (5) are first described.

The metallic fibers are preferably metallic fibers having a cross-sectional diameter in terms of equal area circle equivalent diameter of 2 to 100 μm (preferably 5 to 20 μm) and a length of 2 to 20 mm. Then, the metallic fiber layer (5) is preferably a part of a member (metallic fiber sheet) formed into a sheet shape in which a countless number of the metallic fibers as described above are entangled with each other in a complicated manner. Because current is applied to the metallic fiber layer (5), the metallic fibers are in contact with each other to such a degree that application of current takes place. The metallic fibers are preferably connected to each other at their contact points. The metallic fibers are preferably fusion bonded to each other at their contact points by having, for instance, a history that a part of the metallic fibers are melted by sintering at high temperatures and then solidified.

The metallic fiber sheet is preferably an SUS fiber sheet because of its high heat resistance and chemical resistance. An example of the SUS fiber sheet includes a stainless steel fiber sheet (Tommy Filec SS manufactured by Tomoegawa Co., Ltd.).

The metallic fiber sheet has a basis weight of preferably 25 g/m² or more, and preferably 50 g/m² or more. The basis weight is preferably 1,000 g/m² or less, and more preferably 200 g/m² or less.

The thickness of the metallic fiber sheet is preferably 10 to 600 μm, more preferably 20 to 150 μm, and preferably about 30 μm from the viewpoints of flexibility and strength.

The metallic fiber sheet preferably has a density of 1.0 to 5.0 g/cm³, more preferably 1.4 to 2.0 g/cm³, and preferably about 1.7 g/cm³.

The metallic fiber sheet can be manufactured by both a dry non-woven fabric-manufacturing method and a wet papermaking method. In the case of manufacturing by the wet papermaking method, a countless number of metallic fibers having a cross-sectional diameter in terms of equal area circle equivalent diameter of 2 to 100 μm and a length of 2 to 20 mm are stirred in a dispersion medium (water, an organic solvent or the like); thereafter an organic flocculant or the like is added and the metallic fibers are formed into a sheet shape using a rectangular hand papermaking apparatus (manufactured by Toyo Seiki Seisaku-sho, Ltd.) and a ferrotype drier is used to obtain a dry sheet having a basis weight of 50 to 1,100 g/m². Then, the dry sheet is burned at 400 to 1,300° C. to obtain a metallic fiber sheet. In principle, the organic flocculant does not remain in the metallic fiber sheet.

The material of the metallic fibers is not particularly limited as long as current is applied to generate heat. The material is preferably stainless steel but may be Cu (copper), Al (aluminum), Ni (nickel) or Nichrome.

Figure 3:
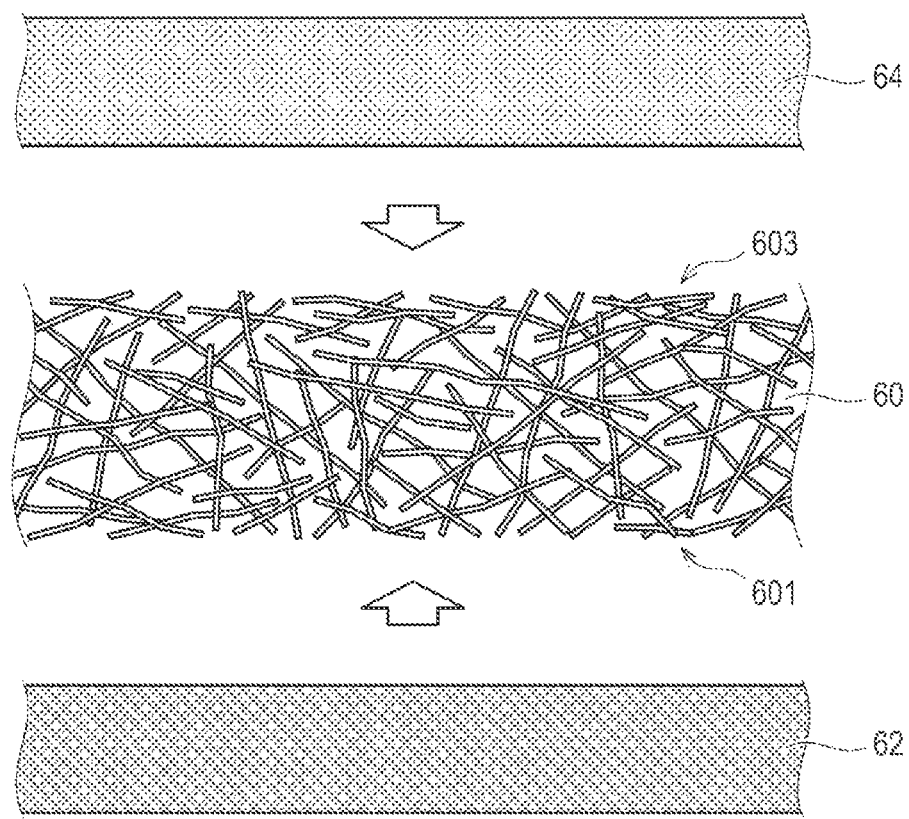
FIG. 3 is a schematic cross-sectional view showing a preferred example of a forming method of a first resin layer, a mixed layer A, a metallic fiber layer, a mixed layer B, and a second resin layer.

A preferred example of a forming method of the first resin layer (10), the mixed layer A (52), the metallic fiber layer (5), the mixed layer B (54), and the second resin layer (12) is described using FIG. 3.

FIG. 3 shows an adhesive sheet (62) consisting of the first resin agent, the above-described metallic fibers formed into a sheet shape (metallic fiber sheet (60)), and an adhesive sheet (64) consisting of the second resin agent.

The first resin layer (10) and the second resin layer (12) are required to have thermal shock resistance, moisture resistance and the like. The first resin layer (10) is also required to be firmly attached to the sheet-like base (3). Further, the second resin layer (12) is required to be firmly attached to the insulating layer (7).

Accordingly, the first resin layer (10) and the second resin layer (12) are required to consist of the first resin agent and the second resin agent having the performance as described above, respectively. As long as the mixed layers can be formed, any type such as a thermosetting type and a thermoplastic type, for example, an acrylic adhesive, a silicone-based adhesive, and a rubber-based elastomer (e.g., NBR) can be used as the first resin agent and the second resin agent.

As shown in FIG. 3, when the adhesive sheet (62) consisting of the first resin agent is attached to one main surface (601) of the metallic fiber sheet (60) and a predetermined pressure is applied, at least a part of the first resin agent constituting the adhesive sheet (62) penetrates into the interior of the metallic fiber sheet (60) (the degree of penetration may be small; for instance, there is also a case where the first resin agent slightly penetrates into the interior of the metallic fiber sheet (60)). When the adhesive sheet (64) consisting of the second resin agent is attached to the an opposite main surface (603) of the metallic fiber sheet (60) and a predetermined pressure is applied, at least a part of the second resin agent constituting the adhesive sheet (64) penetrates into the interior of the metallic fiber sheet (60) (the degree of penetration may be small; for instance, there is also a case where the second resin agent slightly penetrates into the interior of the metallic fiber sheet (60)), so that there is no space between the adhesive sheet (62) and the metallic fiber sheet (60) or between the adhesive sheet (64) and the metallic fiber sheet (60).

A portion formed by penetration of a part of the first resin agent constituting the adhesive sheet (62) into the interior of the metallic fiber sheet (60) serves as the mixed layer A (52) (FIG. 1 and FIG. 2). Therefore, the first resin layer (10) and the mixed layer A (52) contain the same first resin agent and these layers are connected to each other.

A portion formed by penetration of a part of the second resin agent constituting the adhesive sheet (64) into the interior of the metallic fiber sheet (60) serves as the mixed layer B (54) (FIG. 1 and FIG. 2). Therefore, the second resin layer (12) and the mixed layer B (54) contain the same second resin agent and these layers are connected to each other.

A portion of the metallic fiber sheet (60) into which both the first resin agent and the second resin agent do not penetrate, that is, a portion sandwiched between the mixed layer A (52) and the mixed layer B (54) and only including the metallic fibers serves as the metallic fiber layer (5). Therefore, the mixed layer A (52), the mixed layer B (54) and the metallic fiber layer (5) contain the same metallic fibers and these layers are connected to each other.

In this case, the metallic fiber layer (5) contains air in its interior. The air is less likely to be released from within the metallic fiber layer (5). Current is applied to the metallic fibers to generate heat, whereby the air within the metallic fiber layer (5) is heated. The air can remain within the metallic fiber layer (5) for a long period of time and it is therefore assumed that the sheet-like heater of the invention has high heat uniformity and higher power consumption efficiency.

The metallic fiber layer (5) only includes the metallic fibers and in principle, does not contain other substances. This is because the layer which does not contain other substances is more likely to cause application of current. However, there may be a case where a substance that may be incorporated during the manufacturing step, for example, a residual organic flocculant is contained in a minute amount. Also in such a case, the metallic fiber layer (5) should include only the metallic fibers.

The adhesive sheets (62, 64) were used in the above-mentioned preferred example in the method of forming the first resin layer (10), the mixed layer A (52), the metallic fiber layer (5), the mixed layer B (54), and the second resin layer (12). However, the mixed layer A (52) and the first resin layer (10) can also be formed by, for instance, applying a liquid-type first resin agent to the sheet-like base (3) or the metallic fiber sheet (60) to form a layer consisting of the applied first resin agent, sandwiching the layer between the sheet-like base (3) and the metallic fiber sheet (60), and applying a predetermined pressure thereto. The mixed layer B (54) and the second resin layer (12) can also be formed by, for instance, applying a liquid-type second resin agent to the insulating layer (7) or the metallic fiber sheet (60) to form a layer consisting of the applied second resin agent, sandwiching the layer between the insulating layer (7) and the metallic fiber sheet (60), and applying a predetermined pressure thereto.

The thickness of the first resin layer (10) is not particularly limited and is preferably 5 to 100 μm, and more preferably 10 to 50 μm.

The thickness of the mixed layer A (52) is not particularly limited and is preferably 0.5 to 70 μm, and more preferably 1 to 50 μm.

The thickness of the metallic fiber layer (5) is not particularly limited and is preferably 9 to 590 μm, and more preferably 8 to 500 μm.

The thickness of the mixed layer B (54) is not particularly limited and is preferably 0.5 to 70 μm, and more preferably 1 to 50 μm.

The thickness of the second resin layer (12) is not particularly limited and is preferably 5 to 100 μm, and more preferably 10 to 50 μm.

The respective thicknesses of the first resin layer (10), the mixed layer A (52), the metallic fiber layer (5), the mixed layer B (54), and the second resin layer (12) are determined as described below.

An enlarged image (200×) of a cross-sectional surface in a direction perpendicular to the main surface of the sheet-like heater of the invention is obtained, and thereafter in the enlarged image, the thickness of each layer is measured at randomly selected 100 points and a simple average value is determined. Then, the resulting average value is regarded as the thickness of the corresponding layer.

<Insulating Layer>

The insulating layer (7) is now described. The sheet-like heater of the invention preferably has the insulating layer (7).

One main surface (71) of the insulating layer (7) is attached to the second resin layer (12).

When the sheet-like heater (1) of the invention includes the heat diffusion layer (9), the insulating layer (7) has a role in electrically isolating the metallic fiber layer (5) and the heat diffusion layer (9) from each other. Therefore, the insulating layer is preferably made of a material having high insulation properties.

When the sheet-like heater (1) of the invention does not includes the heat diffusion layer (9), the insulating layer (7) preferably has not only insulation properties but also heat conduction.

Exemplary materials of the insulating layer (7) include PET (polyethylene terephthalate), PI (polyimide), PP (polypropylene), PE (polyethylene), PEN (polyethylene naphthalate), TAC (triacetyl cellulose), and ceramic.

The thickness of the insulating layer (7) is not particularly limited, and is preferably 15 to 100 µm, more preferably 30 to 75 mm, and still more preferably about 50 µm.

The thickness of the insulating layer is determined as described below.

An enlarged image (200×) of a cross-sectional surface in a direction perpendicular to the main surface of the sheet-like heater of the invention is obtained, and thereafter in the enlarged image of the cross-sectional surface, the thickness of the insulating layer (7) is measured at randomly selected 100 points and a simple average value is determined. Then, the resulting average value is regarded as the thickness of the insulating layer (7).

When the sheet-like heater (1) of the invention is a sheet-like heater including the sheet-like base (3), the first resin layer (10), the mixed layer A (52), the metallic fiber layer (5), the mixed layer B (54), the second resin layer (12), and the insulating layer (7) as shown in FIG. 1, its thickness is preferably 100 to 500 µm, and more preferably 150 to 400 µm. When the thickness is within the above range, the sheet-like heater of the invention can be more preferably used as a heater for heating piping. When the sheet-like heater (1) of the invention is a sheet-like heater including the sheet-like base (3), the first resin layer (10), the mixed layer A (52), the metallic fiber layer (5), the mixed layer B (54), the second resin layer (12), the insulating layer (7), the third adhesion layer (14), the heat diffusion layer (9), and the fourth adhesion layer (16) as shown in FIG. 2, its thickness is preferably 100 to 700 µm, and more preferably 150 to 600 µm. When the thickness is within the above range, the sheet-like heater of the invention can be more preferably used as a heater for heating the interior of an electric vehicle.

When the sheet-like heater (1) of the invention is a sheet-like heater including the sheet-like base (3), the first resin layer (10), the mixed layer A (52), the metallic fiber layer (5), the mixed layer B (54), the second resin layer (12), and the insulating layer (7) as shown in FIG. 1, its thickness is determined as described below.

An enlarged image (200×) of a cross-sectional surface in a direction perpendicular to the main surface of the sheet-like heater of the invention is obtained, and thereafter in the enlarged image of the cross-sectional surface, the thickness of the sheet-like heater (1) of the invention is measured at randomly selected 100 points and a simple average value is determined. Then, the resulting average value is regarded as the thickness of the sheet-like heater (1) of the invention.

<Third Adhesion Layer>

The third adhesion layer (14) is now described. The sheet-like heater of the invention preferably has the third adhesion layer (14).

The third adhesion layer (14) is attached to the opposite main surface (72) of the insulating layer (7).

In the sheet-like heater (1) of the invention, the third adhesion layer (14) has a role in adhering the insulating layer (7) and the heat diffusion layer (9) to each other.

The material of the third adhesion layer (14) may be the same as those of the above-mentioned first resin layer (10) and the second resin layer (12). That is, the third adhesive that constitutes the third adhesion layer (14) may be the same as the first resin agent and the second resin agent.

An adhesive sheet can be used as the third adhesion layer (14).

The thickness of the third adhesion layer (14) is not particularly limited and is preferably 5 to 100 µm, and more preferably 10 to 50 µm.

The thickness of the third adhesion layer is determined as described below.

An enlarged image (200×) of a cross-sectional surface in a direction perpendicular to the main surface of the sheet-like heater of the invention is obtained, and thereafter in the enlarged image of the cross-sectional surface, the thickness of the third adhesion layer (14) is measured at randomly selected 100 points and a simple average value is determined. Then, the resulting average value is regarded as the thickness of the third adhesion layer (14).

<Heat Diffusion Layer>

The heat diffusion layer (9) is now described. The sheet-like heater of the invention preferably has the heat diffusion layer (9).

One main surface (91) of the heat diffusion layer (9) is attached to the third adhesion layer (14).

The heat diffusion layer (9) in the sheet-like heater (1) of the invention has a role in diffusing heat generated by applying current to the metallic fiber layer (5). The sheet-like heater of the invention has thus more heat uniformity.

The thermal conductivity of the heat diffusion layer (9) in its planar direction is preferably higher than that of the metallic fiber layer (5) in its planar direction because the performance in diffusing heat generated by applying current to the metallic fiber layer (5) is further enhanced.

The thermal conductivity of the heat diffusion layer is measured at ordinary temperatures by well-known measuring methods including measurement of the thermal diffusivity using the laser flash technique (for example, LFA series manufactured by NETZSCH) and measurement of the thermal diffusivity using the AC technique (for example, LaserPit series manufactured by ADVANCE RIKO, Inc.).

Exemplary materials of the heat diffusion layer (9) include carbon, metals such as aluminum, copper, zinc, lead, gold, and silver, and ceramic materials such as alumina and aluminum nitride.

The heat diffusion layer preferably consists of a carbon film because the flexibility is excellent, and the thermal conductivity in a direction in which the layer extends is also high.

The heat diffusion layer and the metallic fiber layer are preferably made of a carbon film and an SUS fiber sheet, respectively, because effects of electrolytic corrosion exhibited between metals that are often seen during use for a long period of time can be avoided.

The thickness of the heat diffusion layer (9) is not particularly limited, and is preferably 5 to 300 µm, more preferably 15 to 200 µm, and still more preferably about 200 µm.

The thickness of the heat diffusion layer is determined as described below.

An enlarged image (200×) of a cross-sectional surface in a direction perpendicular to the main surface of the sheet-like heater of the invention is obtained, and thereafter in the enlarged image of the cross-sectional surface, the thickness of the heat diffusion layer (9) is measured at randomly selected 100 points and a simple average value is determined. Then, the resulting average value is regarded as the thickness of the heat diffusion layer (9).

<Fourth Adhesion Layer>

The fourth adhesion layer (16) is now described. The sheet-like heater of the invention preferably has the fourth adhesion layer (16).

The fourth adhesion layer (16) is attached to the opposite main surface (92) of the heat diffusion layer (9).

In the sheet-like heater (1) of the invention, the fourth adhesion layer (16) has a role in adhering the sheet-like heater (1) of the invention to a desired place, for example, a desired place in an electric vehicle.

The material of the fourth adhesion layer (16) may be the same as that of the above-mentioned first resin layer (10), the second resin layer (12) or the third adhesion layer (14). That is, the fourth adhesive that constitutes the fourth adhesion layer (16) may be the same as the first resin agent, the second resin agent or the third adhesive.

An adhesive sheet can be used as the fourth adhesion layer (16).

The thickness of the fourth adhesion layer (16) is not particularly limited and is preferably 5 to 100 µm, and more preferably 10 to 50 µm.

The thickness of the fourth adhesion layer is determined as described below.

An enlarged image (200×) of a cross-sectional surface in a direction perpendicular to the main surface of the sheet-like heater of the invention is obtained, and thereafter in the enlarged image of the cross-sectional surface, the thickness of the fourth adhesion layer (16) is measured at randomly selected 100 points and a simple average value is determined. Then, the resulting average value is regarded as the thickness of the fourth adhesion layer (16).

The sheet-like heater (1) of the invention may have a protective layer on a main surface of the fourth adhesion layer (16) on a side on which the heat diffusion layer (9) is not attached. In this case, the sheet-like heater (1) of the invention has easier handling.

For instance, when the sheet-like heater of the invention is attached to the wall of an electric vehicle for use as a heater for heating the interior of the electric vehicle, the protective layer is peeled off from the fourth adhesion layer (16) to expose the fourth adhesion layer (16).

The material, the thickness and the like of the protective layer may be the same as those of the sheet-like base (3) or the insulating layer (7). The protective layer is preferably subjected to release treatment.

<Preferred Embodiment of Metallic Fiber Layer>

Figure 4:
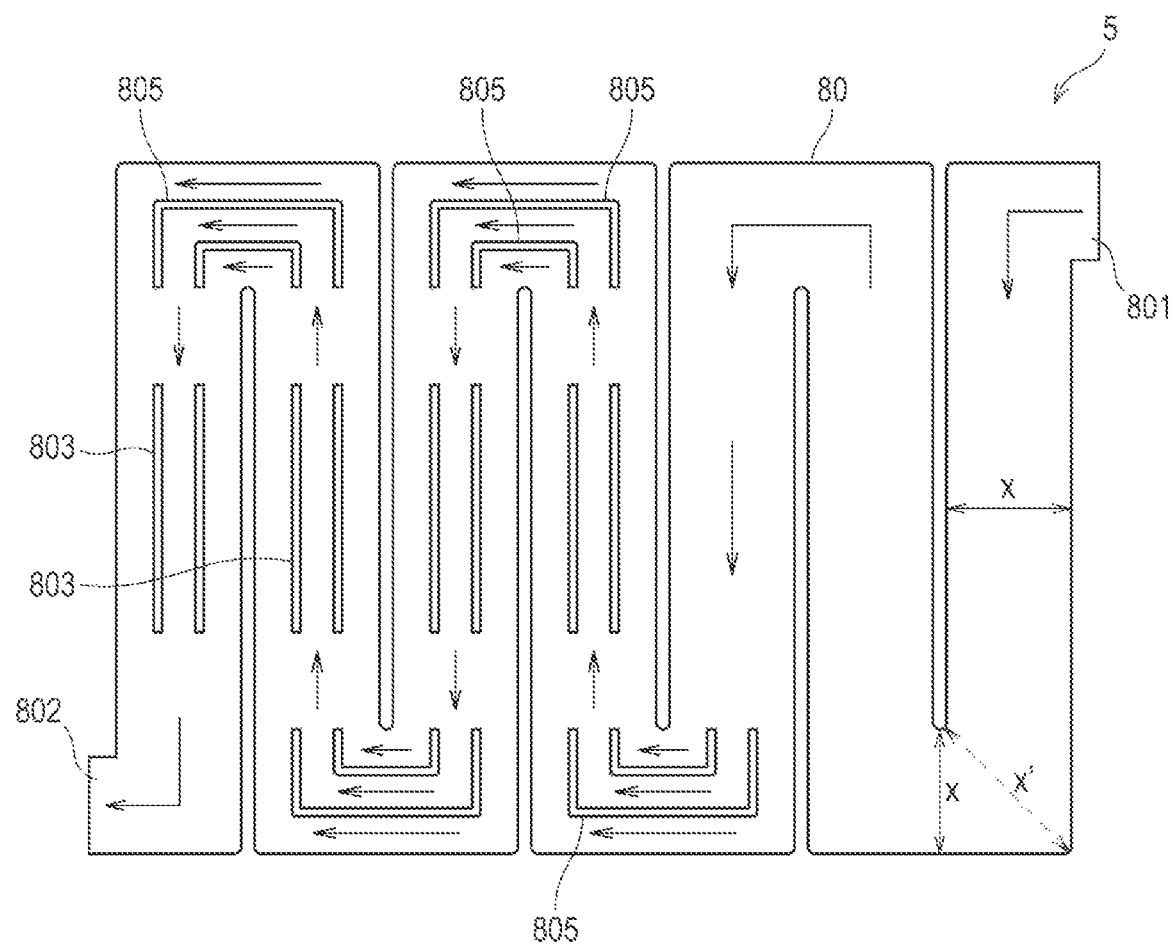
FIG. 4 is a view (schematic view) showing a preferred embodiment of a main surface of the metallic fiber layer.

A preferred embodiment of the metallic fiber layer is described using FIG. 4.

FIG. 4 is a view (schematic view) showing a preferred embodiment of a main surface of the metallic fiber layer (5).

The embodiment of the main surface in each of the metallic fiber layers (5) in FIG. 1 and FIG. 2 is the same as that of the main surface of the metallic fiber sheet (60) in FIG. 3. Therefore, FIG. 4 can also be deemed to be a view (schematic view) showing a preferred embodiment of the main surface of the metallic fiber sheet (60).

As shown in FIG. 4, the metallic fiber layer (5) is preferably patterned so that, when current is applied, the current flows within a band-like electrical flow path (80) having a width X of 100 mm or less (preferably 50 mm or less) from an electrical input side (801) to an electrical output side (802) because the current density in the width direction falls within a suitable range, and as a result, heat can be generated with suitable uniformity. The inventors of the present application found that heat uniformity is less likely to be increased when the width X exceeds 100 mm. The inventors of the present application also found that, when the width X exceeds 100 mm, electrodes on the electrical input and output sides are widened in the width direction to make the voltage applied in the width direction constant, whereby the width over which heat uniformity is possible can be increased.

It is to be noted that the width of the band-like electrical flow path (80) means the width of linear portions or smooth curved portions. As shown in FIG. 4, depending on the patterning method, the width of a part of the band-like electrical flow path (width X' of a bent portion where the electrical flow path is bent at a right angle) may exceed 100 mm. However, also in this case, the width X of the linear portions of the band-like electrical flow path is 100 mm or less and accordingly the metallic fiber layer (5) shown in FIG. 4 corresponds to the metallic fiber layer (5) that is patterned so that, when current is applied, the current flows within the band-like electrical flow path having the width X of 100 mm or less from the electrical input side (801) to the electrical output side (802).

At least a part of the electrical flow path 80 preferably has slits (803, 805) formed along directions (directions indicated by arrows in FIG. 4) in which the current flows. Further, the slits (805) are preferably formed at bent portions of the electrical flow path.

This is because the current pathway in the width direction is controlled with respect to concentration of the current density on the bent portion inner side which is exhibited at the bent portions, thereby suppressing the concentration of the current density, thus resulting in higher heat uniformity.

The slits are holes and current does not flow in the width direction of each slit. To put it the other way around, each slit needs to have such a width that current does not flow.

The metallic fiber layer (5) as shown in FIG. 4 can be obtained by patterning the metallic fiber sheet (60). Specifically, patterning can be made by physical cutting using a fiber laser, a $CO_2$ laser, a Thomson blade or the like.

Figure 5:
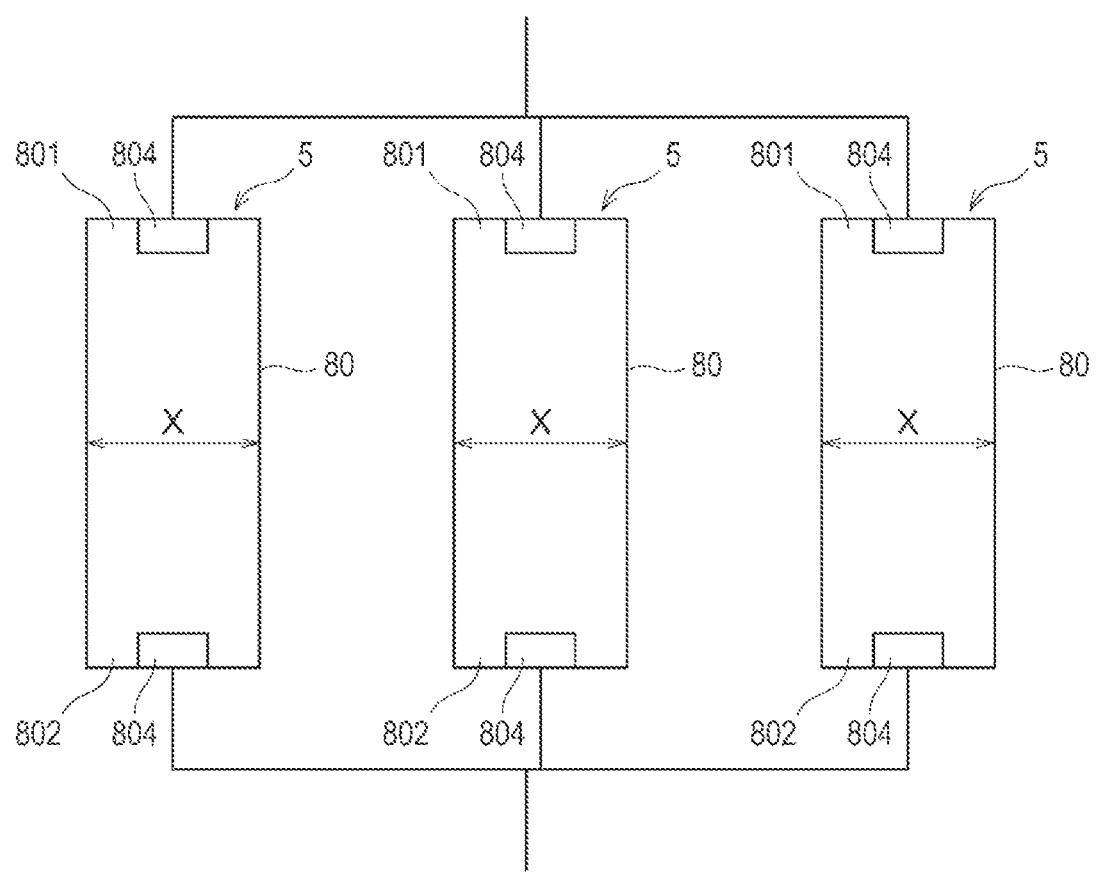
FIG. 5 is a view (schematic view) showing another preferred embodiment of the main surface of the metallic fiber layer.

Next, another preferred embodiment of the metallic fiber layer is described using FIG. 5.

FIG. 5 is a view (schematic view) showing a preferred embodiment of a main surface of the metallic fiber layer (5). As in the above-mentioned FIG. 4, FIG. 5 can also be deemed to be a view (schematic view) showing the preferred embodiment of the main surface of the metallic fiber sheet (60).

FIG. 5 shows the embodiment in which the band-like metallic fiber layers (5) are disposed in parallel. The number of the band-like metallic fiber layers (5) shown in FIG. 5 is three but is not particularly limited.

When applied through electrodes (804), current flows within each of the band-like electrical flow paths (80) from the electrical input side (801) to the electrical output side (802).

The thickness X of each of the band-like metallic fiber layers (5) is preferably 100 mm or less, and more preferably 50 mm or less. The inventors of the present application found that heat uniformity is more likely to be increased when the width X is 100 mm or less. The inventors of the present application also found that, when the width X exceeds 100 mm, electrodes on the electrical input and output sides are widened in the width direction to make the voltage applied in the width direction constant, whereby the width over which heat uniformity is possible can be increased.

INDUSTRIAL APPLICABILITY

The sheet-like heater of the invention can be used as a heater for heating the interior of an electric vehicle. Other exemplary applications include heaters for domestic use such as a floor heater and a toilet seat heater, and heaters for industrial use such as a paint or gas piping heater (heater for heating piping).

The invention claimed is:

1. A sheet-like heater having a layered structure, the sheet-like heater comprising:
   a first resin layer, the first resin layer including a first resin agent;
   a mixed layer A connected to the first resin layer, the mixed layer A including a mixture of the first resin agent and metallic fibers;
   a metallic fiber layer connected to the mixed layer A, the metallic fiber layer including the metallic fibers and air between the metallic fibers;
   a mixed layer B connected to the metallic fiber layer, the mixed layer B including a mixture of the metallic fibers and a second resin agent; and
   a second resin layer connected to the mixed layer B, the second resin layer including the second resin agent,
   wherein the mixed layer A and the mixed layer B are overlapped with each other and spaced apart from each other to form an interior space,
   the interior space corresponds to the metallic fiber layer and is filled with only the metallic fibers and the air, and
   the metallic fibers are fusion bonded to each other.

2. The sheet-like heater according to claim 1, further comprising:
   an insulating layer having a first surface attached to the second resin layer.

3. The sheet-like heater according to claim 2, further comprising:
   a first adhesion layer attached to a second surface of the insulating layer, the second surface being outwardly opposite to the first surface of the insulating layer, the first adhesion layer including a first adhesive;
   a heat diffusion layer having a third surface and a fourth surface outwardly opposite to each other, the third surface being attached to the first adhesion layer; and
   a second adhesion layer attached to the fourth surface of the heat diffusion layer, the second adhesion layer including a second adhesive.

4. The sheet-like heater according to claim 3,
   wherein a thermal conductivity of the heat diffusion layer in a planar direction thereof is higher than a thermal conductivity of the metallic fiber layer in a planar direction thereof.

5. The sheet-like heater according to claim 3,
   wherein the metallic fiber layer includes a stainless steel fiber sheet, and
   the heat diffusion layer includes a carbon film.

6. The sheet-like heater according to claim 1, further comprising:
   a sheet-like base attached to the first resin layer at an opposite side of the first resin layer with respect to the mixed layer A,
   wherein the sheet-like base has an insulation property and/or a thermal insulation property.

7. The sheet-like heater according to claim 1,
   wherein the metallic fiber layer is configured to have a band-like electrical flow path through which a current flows, and
   the band-like electrical flow path has a width of 100 mm or less from an electrical input side to an electrical output side of the metallic fiber layer.

8. The sheet-like heater according to claim 7,
   wherein at least a part of the band-like electrical flow path has a plurality of slits formed along a flow direction of the current.

9. The sheet-like heater according to claim 8,
   wherein the band-like electrical flow path is bent a plurality of times, and the plurality of slits are formed in at least one of bending portions of the band-like electrical flow path.

* * * * *